United States Patent
LeBlanc et al.

(10) Patent No.: US 7,987,095 B2
(45) Date of Patent: Jul. 26, 2011

(54) METHOD AND SYSTEM FOR DUAL MODE SUBBAND ACOUSTIC ECHO CANCELLER WITH INTEGRATED NOISE SUPPRESSION

(75) Inventors: Wilfrid LeBlanc, Vancouver (CA); Jes Thyssen, Laguna Niguel (CA)

(73) Assignee: Broadcom Corporation, Irvine, CA (US)

( * ) Notice: Subject to any disclaimer, the term of this patent is extended or adjusted under 35 U.S.C. 154(b) by 1083 days.

(21) Appl. No.: 11/672,120

(22) Filed: Feb. 7, 2007

(65) Prior Publication Data

US 2008/0189116 A1  Aug. 7, 2008

Related U.S. Application Data

(63) Continuation-in-part of application No. 10/313,367, filed on Dec. 6, 2002, now Pat. No. 7,283,585.

(60) Provisional application No. 60/414,059, filed on Sep. 27, 2002, provisional application No. 60/414,460, filed on Sep. 27, 2002, provisional application No. 60/414,492, filed on Sep. 27, 2002, provisional application No. 60/414,491, filed on Sep. 27, 2002, provisional application No. 60/414,493, filed on Sep. 27, 2002.

(51) Int. Cl.
*G10L 19/00* (2006.01)

(52) U.S. Cl. ............ 704/500; 704/501; 381/66
(58) Field of Classification Search ........ 704/500, 704/501, 219; 381/66
See application file for complete search history.

(56) References Cited

U.S. PATENT DOCUMENTS

| | | | |
|---|---|---|---|
| 5,970,154 A * | 10/1999 | Chen et al. | 381/66 |
| 7,246,065 B2 * | 7/2007 | Tanaka et al. | 704/500 |
| 7,301,902 B2 * | 11/2007 | Rambo et al. | 370/230 |
| 7,443,978 B2 * | 10/2008 | Isaka et al. | 379/406.03 |
| 2002/0072899 A1 * | 6/2002 | Paksoy et al. | 704/219 |
| 2004/0076226 A1 * | 4/2004 | LeBlanc et al. | 375/222 |
| 2004/0153313 A1 * | 8/2004 | Aubauer et al. | 704/206 |
| 2006/0020450 A1 * | 1/2006 | Miseki | 704/219 |
| 2007/0088542 A1 * | 4/2007 | Vos et al. | 704/219 |

* cited by examiner

*Primary Examiner* — Talivaldis Ivars Smits
*Assistant Examiner* — Shaun Roberts
(74) *Attorney, Agent, or Firm* — McAndrews, Held & Malloy, Ltd.

(57) ABSTRACT

Certain aspects of a method and system for a dual mode subband acoustic echo canceller with integrated noise suppression may include splitting an input signal into a lowband component and a highband component. The subbands of each of the lowband component and the highband component may be processed in order to reduce an echo associated with the input signal and to suppress the noise associated with the input signal.

20 Claims, 7 Drawing Sheets

METHOD AND SYSTEM FOR DUAL MODE SUBBAND ACOUSTIC ECHO CANCELLER WITH INTEGRATED NOISE SUPPRESSION

CROSS-REFERENCE TO RELATED APPLICATIONS/INCORPORATION BY REFERENCE

The present application is a continuation-in-part of application Ser. No. 10/313,367 filed on Dec. 6, 2002, now U.S. Pat. No. 7,283,585, which makes reference to, claims priority to and claims benefit from U.S. Provisional Patent Application Ser. No. 60/414,059 filed on Sep. 27, 2002, U.S. Provisional Patent Application Ser. No. 60/414,460 filed on Sep. 27, 2002, U.S. Provisional Patent Application Ser. No. 60/414,492 filed on Sep. 27, 2002, U.S. Provisional Patent Application Ser. No. 60/414,491 filed on Sep. 27, 2002, and U.S. Provisional Patent Application Ser. No. 60/414,493 filed on Sep. 27, 2002.

This application also makes reference to:
U.S. application Ser. No. 10/313,672 filed Dec. 6, 2002.

The above referenced application is hereby incorporated herein by reference in its entirety.

FIELD OF THE INVENTION

Certain embodiments of the invention relate to wireless communication systems. More specifically, certain embodiments of the invention relate to a method and system for a dual mode subband acoustic echo canceller with integrated noise suppression.

BACKGROUND OF THE INVENTION

Bluetooth is an international open standard that allows devices to wirelessly communicate with each other. Bluetooth is a short-range wireless technology that allows Bluetooth enabled devices such as computers, cell phones, keyboards and headphones to establish connections without using wires or cables to couple the devices to each other. Bluetooth is currently incorporated into numerous commercial products including desktop computers, laptops, PDAs, cell phones, keyboards, headsets and printers, with more products being constantly added to the list of Bluetooth enabled devices.

The Bluetooth sub-band codec (SBC) is a low computational complexity audio coding system designed to provide high quality audio at moderate bit rates to Bluetooth enabled devices. The Bluetooth SBC system utilizes a cosine modulated filterbank, for example, for analysis and synthesis. The filterbank may be configured for 4 subbands or 8 subbands, for example. The subband signals may be quantized using a dynamic bit allocation scheme and block adaptive pulse code modulation (PCM) quantization. The number of bits available and the number of bits used for quantization may vary, thereby making the overall bit-rate of the SBC system variable or adjustable. This is advantageous for use in wireless applications where the available wireless bandwidth for audio, and the maximum possible bit-rate may vary over time.

The Bluetooth community has developed various specifications that define how to use streaming audio over a Bluetooth link. This opens up Bluetooth technology to a whole new class of audio devices, such as wireless stereo headsets, wireless speakers, and wireless portable MP3 players just to name a few. With the introduction of new Bluetooth specifications for streaming audio, new Bluetooth products such as wireless stereo headsets and wireless file streaming applications are becoming a reality. Wireless applications require solutions that are increasingly low power in order to extend battery life and provide a better end user experience. With existing systems, the computational requirements of high fidelity audio coding may make it cost prohibitive and challenging to add features such as streaming music to some wireless devices especially mobile devices.

Packet based telephony such as Internet Protocol (IP) telephony may provide an alternative to conventional circuit switched telephony, the latter of which may typically require the establishment of an end-to-end communication path prior to the transmission of information. In particular, IP telephony permits packetization, prioritization and simultaneous transmission of voice traffic and data without requiring the establishment of an end-to-end communication path. IP telephony systems may capitalize on voice over packet (VoP) technologies, which may provide a means by which voice, video and data traffic may be simultaneously transmitted across packet networks. The data may include video data.

Voice quality (VQ) is a metric, which may be used to define a qualitative and/or quantitative measure regarding the quality and/or condition of a received voice signal. Voice clarity may be an indicator of the quality or condition of a voice signal. Voice quality may be an important metric that may ultimately dictate a quality of service (QoS) offered by a network service provider. The following factors, for example, may affect the voice quality and/or condition of a voice signal—noise, echo, and delay or packet latency. However, the effects of these factors may be cumulative. In this regard, factors such as delay and latency may exacerbate the effects of echo, for example. Delays that may affect the voice quality may include, but are not limited to, routing, queuing and processing delays.

Various VoP specifications, recommendations and standards have been created to ensure interoperability between various network components, and to create an acceptable QOS which may include voice quality. For example, the International Telecommunications Union (ITU) ratified H.323 specification, which may define various processes by which voice, video and data may be transported over IP networks for use in VoIP networks. The H.323 specification addresses, for example, delay by providing a prioritization scheme in which delay sensitive traffic may be given processing priority over less delay sensitive traffic. For example, voice and video may be given priority over other forms of data traffic.

The H.323 specification also addresses voice quality by specifying the audio and video coders/decoders (CODECs) that may be utilized for processing a media stream. A CODEC may be a signal processor such as a digital signal processor (DSP) that may be adapted to convert an analog voice and/or video signal into a digital media stream and for converting a digital media stream into an analog voice and/or video signal. In this regard, a coder or encoder portion of the CODEC may convert an analog voice and/or video signal into a digital media stream. Additionally, a decoder portion of the CODEC may convert a digital media stream into an analog voice and/or video signal. Regarding the CODEC for audio signals, H.323 may support recommendations such as ITU-T G.711, G.722, G.723.1, G.728 and G.729 recommendations. The ITU-T G.711 recommendations may support audio coding at 64 Kbps, G.722 may support audio coding at 64 Kbps, 56 kbps and 48 Kbps, G.723.1 may support audio coding at 5.3 Kbps and 6.3 Kbps, G.728 may support audio coding at 16 Kbps and G.729 may support audio coding at 8 Kbps.

The voice quality of a speech CODEC may be dependent on factors such as the type of encoding and/or decoding algorithm utilized by the CODEC. In general, some CODECs may utilize compression algorithms that remove redundant information from the analog signal. Such compression algorithms may permit at least a close replication of an original analog signal. In this case, the bandwidth required for transmitting any resultant signal may be reduced. Other CODECs may utilize algorithms that analyze the signal and retain only those portions that are deemed to be of cognitive importance. These algorithms may reproduce a close approximation to the original signal. Notwithstanding, in this latter case, bandwidth utilization may be superior to the former case where redundant information may be removed. Accordingly, depending on application requirements and hardware limitations, one or more algorithms may be utilized to optimize performance.

Moreover, although economic attractiveness of VoP have lured network access providers and network transport providers away from traditional circuit switching networks, factors such as the extensiveness of embedded legacy systems and customer demands, for example, have dictated the coexistence of both packet switched and circuit switch networks. Accordingly, new technologies and techniques such as audio and video coding and decoding may be required to support various modes of operation utilized by each system.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a dual mode subband acoustic echo canceller with integrated noise suppression, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a dual mode subband acoustic echo canceller with integrated noise suppression. Aspects of the method and system may comprise splitting an input signal into a lowband component and a highband component. The subbands of each of the lowband component and the highband component may be processed in order to reduce an echo associated with the input signal and to suppress the noise associated with the input signal.

Figure 1:
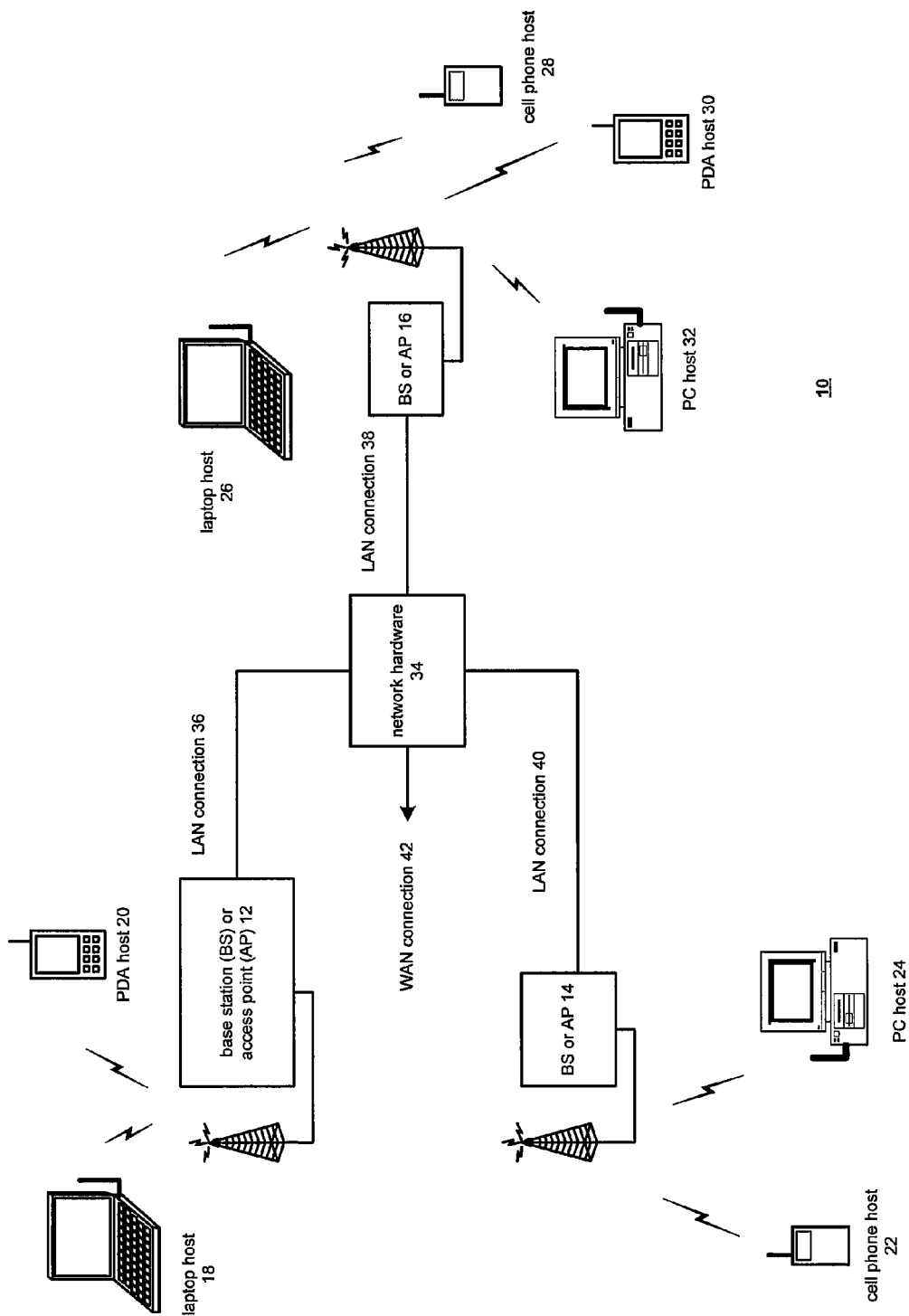
FIG. 1 illustrates a block diagram of a wireless communication system in accordance with an embodiment of the present invention.

FIG. 1 illustrates a block diagram of a wireless communication system in accordance with an embodiment of the present invention. Referring to FIG. 1, there is shown a block diagram of a communication system 10 that comprises a plurality of base stations and/or access points 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28.

The base stations or access points 12-16 may be operably coupled to the network hardware 34, for example, via local area network connections 36, 38 and 40. The network hardware 34, for example, a router, switch, bridge, modem, or system controller, may provide a wide area network connection 42 for the communication system 10. Each of the base stations or access points 12-16 may have an associated antenna or antenna array to communicate with the wireless communication devices in its area. Typically, the wireless communication devices may register with a particular base station or access point 12-16 to receive services from the communication system 10. For direct connections, for example, point-to-point communications, wireless communication devices may communicate directly via one or more allocated channels.

Typically, base stations may be used for cellular telephone systems and similar type of systems, while access points may be used for in-home or in-building wireless networks, although those terms are often used interchangeably. Regardless of the particular type of communication system, each wireless communication device may include a built-in radio and/or may be coupled to a radio.

Figure 2:
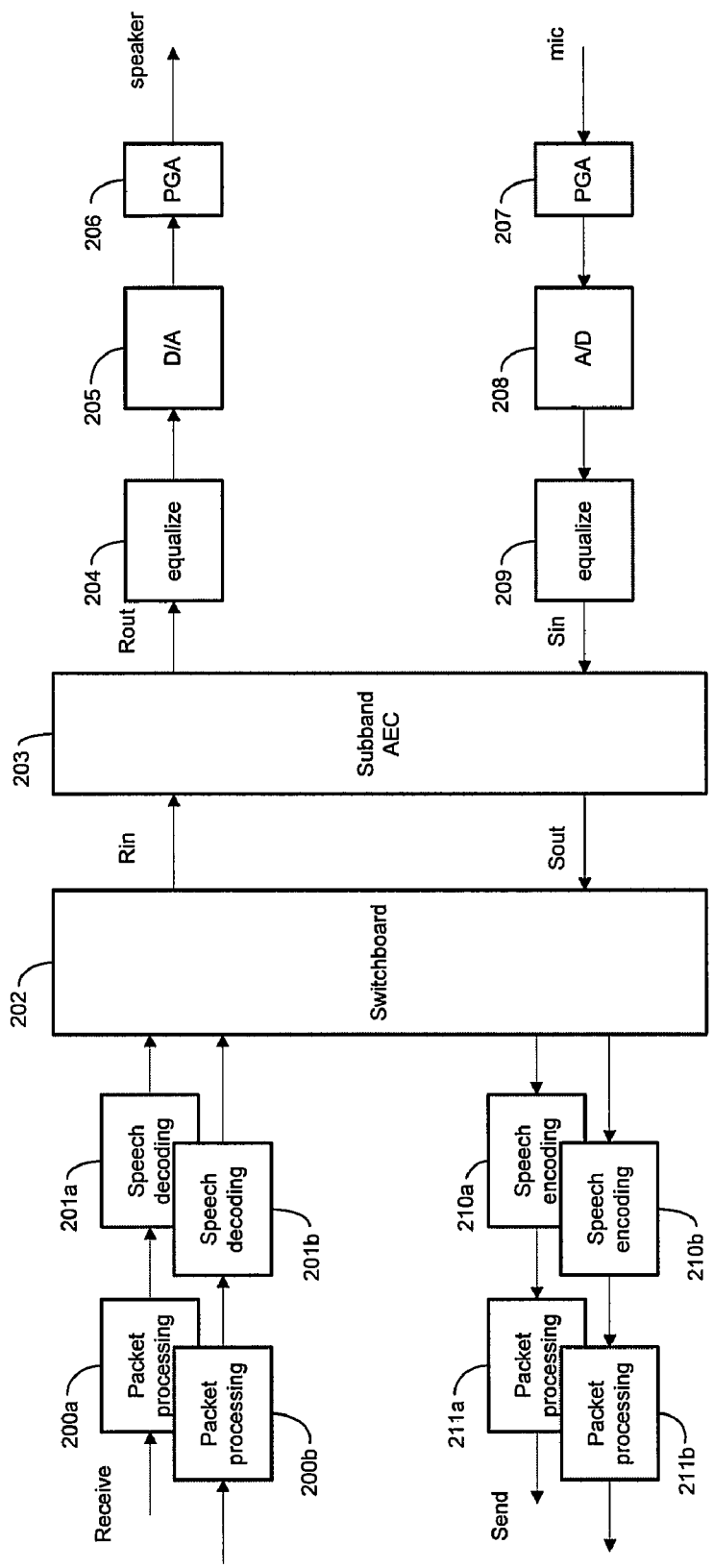
FIG. 2 is a block diagram of an exemplary audio processing system for voice over IP, in accordance with an embodiment of the invention.

FIG. 2 is a block diagram of an exemplary audio processing system for voice over IP, in accordance with an embodiment of the invention. Referring to FIG. 2, there is shown a plurality of receive packet processing blocks 200a and 200b, a plurality of speech decoding blocks 201a and 201b, a switchboard 202, a subband audio echo canceller 203, a receive equalizer 204, a digital to analog converter (DAC) 205, a plurality of power gain amplifiers (PGAs) 206 and 207, an analog to digital converter (ADC) 208, a send equalizer 209, a plurality of speech encoding blocks 210a and 210b, a plurality of send packet processing blocks 211a and 211b.

The plurality of receive packet processing blocks 200a and 200b may be enabled to receive input signals, for example, audio, video, voice or data signals. The plurality of receive packet processing blocks 200a and 200b may be enabled to convert the input signals into an electronic signal, digitize the electronic signal, and packetize the digital samples. The sampling rate for digitizing the electronic signal may be either 8 kHz, for example, for narrowband or lowband sampling, or 16 kHz, for example, for wideband sampling. Accordingly, narrowband sampling may be bandwidth limited to 4 kHz, for example, while wideband sampling may be bandwidth limited to 8 kHz, for example. The plurality of speech decoding blocks 201a and 201b may be enabled to decode the plurality of received input signals. The plurality of speech decoding blocks 201a and 201b may be enabled to decode each of the lowband and highband components of the plurality of input signals.

The switchboard 202 may comprise suitable logic, circuitry, and/or code that may be enabled to read and write data through a plurality of sample buffer interfaces. The high and low-band sample buffer interfaces may provide data at any arbitrary sampling rate. In an embodiment of the present invention, a low-band sample buffer interface may provide data sampled at 8 kHz, for example, and a high-band sample buffer interface may provide data sampled at 16 kHz, for example. U.S. application Ser. No. 10/313,672 filed Dec. 6, 2002, provides a detailed description of a switchboard for multiple data rate communication systems, and is hereby incorporated by reference in its entirety. The switchboard 202 may be enabled to receive the plurality of lowband and highband components of the plurality of received input signals and generate an input signal Rin to the subband acoustic echo canceller 203. The switchboard 202 may be enabled to receive an output signal Sout from the subband acoustic echo canceller 203 and generate a plurality of narrowband components and wideband components.

The low-band signals or data may be stored as 8 kHz sampled data, for example, while the high-band data may be stored as 16 kHz sampled data, for example. A wideband signal may comprise a combination of lowband and highband components. The lowband and highband components may differ in their ingress and egress sample buffer interface. A wideband component may have useful data at its high and low-band sample buffer interfaces and may include both narrowband and wideband services and functions. A narrowband component may have useful data at its low-band sample buffer interface and may not have data at its high-band sample buffer interface. The switchboard 202 may be enabled to interface with narrowband and wideband components through their high and low-band sample buffer interfaces. The switchboard 202 may be incognizant of the wideband or narrowband nature of the components. The switchboard 202 may be enabled to read and write data through the sample buffer interfaces. The high and low-band sample buffer interfaces may provide data at any arbitrary sampling rate. In accordance with an embodiment of the invention, the low-band sample buffer interface may provide data sampled at 8 kHz, for example, and the high-band sample buffer interface may provide data sampled at 16 kHz, for example.

The subband acoustic echo canceller 203 may comprise suitable logic, circuitry, and/or code that may be enabled to receive an input signal Rin from the switchboard 202 and reduce or cancel an echo associated with the input signal Rin based on subband processing of each of the lowband and highband components of the plurality of received input signals. The subband acoustic echo canceller 203 may be enabled to receive an input signal Sin from the equalizer 209 and reduce an echo associated with the input signal Sin based on subband processing of each of the lowband and highband components of the plurality of received input signals.

The equalizer 204 may comprise suitable logic, circuitry, and/or code that may be enabled to receive an output signal Rout from the subband acoustic echo canceller 203 and compensate for an echo associated with the input signal. The equalizer 204 may be enabled to apply a separate gain per subband for the input signal. The equalizer 209 may comprise suitable logic, circuitry, and/or code that may be enabled to compensate for an echo associated with an input signal from, for example, a MIC. The equalizer 209 may be enabled to apply a separate gain per subband for the input signal.

The DAC 205 may comprise suitable logic, circuitry, and/or code that may be enabled to convert the received digital signal from the equalizer 204. The DAC 204 may be enabled to convert the received digital signal to an analog signal and generate an output to the PGA 206. The PGA 206 may comprise suitable logic, circuitry, and/or code that may be enabled to amplify the received analog signal from the DAC 205 and generate an amplified output signal to a speaker.

The PGA 207 may comprise suitable logic, circuitry, and/or code that may be enabled to amplify a received analog signal from, for example, a MIC and generate an amplified output signal to the ADC 208. The ADC 208 may comprise suitable logic, circuitry, and/or code that may be enabled to convert the received analog signal from the PGA 207. The ADC 208 may be enabled to convert the received analog signal to a digital signal and generate an output to the equalizer 209. The equalizer 209 may comprise suitable logic, circuitry, and/or code that may be enabled to receive an input signal from the ADC 208 and compensate for an echo associated with the input signal. The equalizer 209 may be enabled to compensate for an echo associated with an input signal from a MIC.

The plurality of speech encoding blocks 210a and 210b may be enabled to encode each of the plurality of lowband and highband components of the plurality of received input signals. The plurality of send packet processing blocks 211a and 211b may be enabled to process each of the plurality of lowband and highband components of the plurality of received input signals and generate a plurality of output signals. The plurality of output signals may be, for example, audio, video, voice or data signals.

Figure 3A:
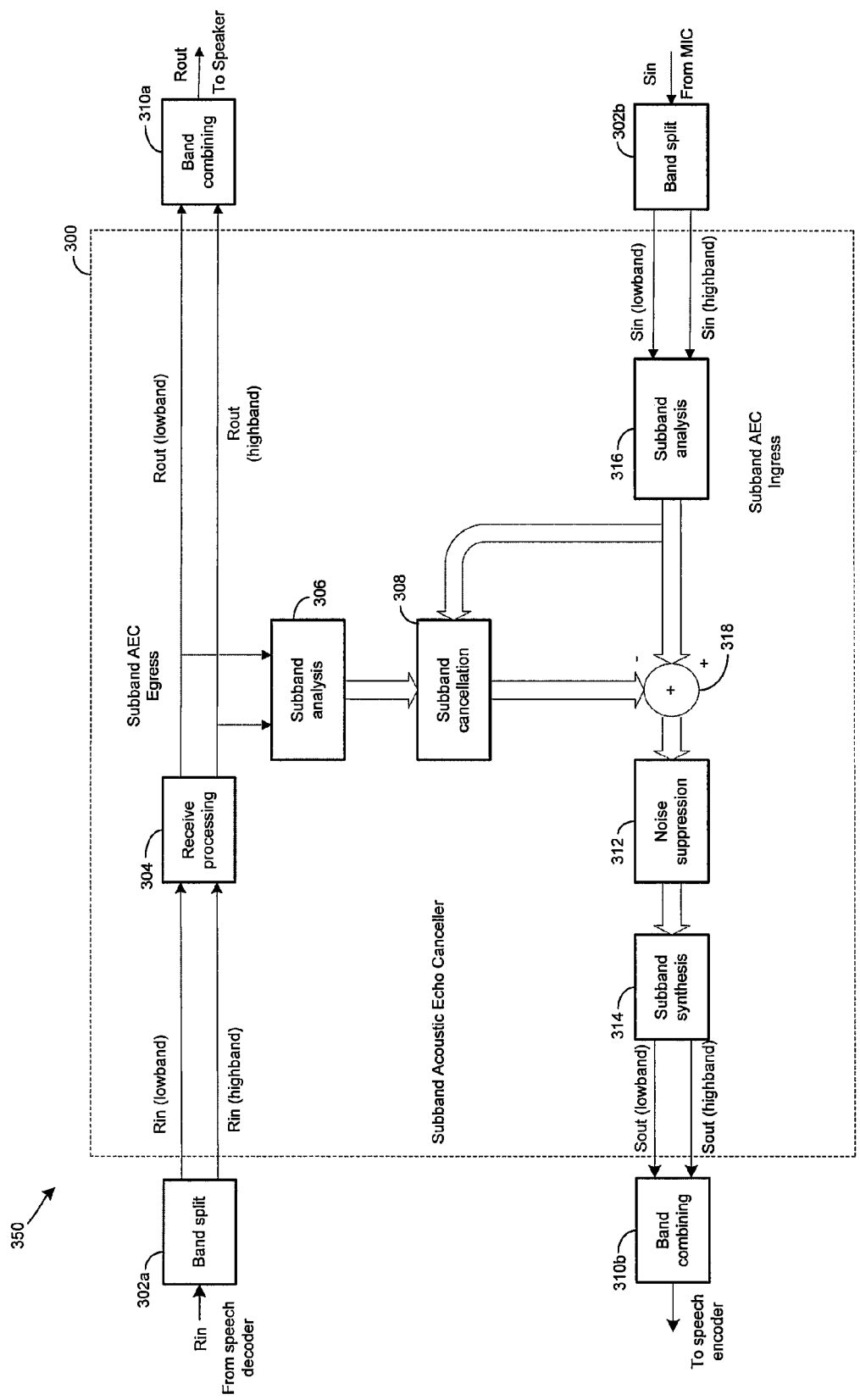
FIG. 3A is a block diagram of an exemplary dual mode subband acoustic echo canceller with integrated noise suppression, in accordance with an embodiment of the invention.

FIG. 3A is a block diagram of an exemplary dual mode subband acoustic echo canceller with integrated noise suppression, in accordance with an embodiment of the invention. Referring to FIG. 3A, there is shown a split-band architecture 350. The split-band architecture 350 may comprise a plurality of band split blocks 302a and 302b, a subband acoustic echo canceller 300, and a plurality of band combining blocks 310a and 310b. The subband acoustic echo canceller 300 may comprise a receive processing block 304, a plurality of subband analysis blocks 306 and 316, a subband cancellation block 308, a subband synthesis block 314, a subband noise suppression block 312 and a summer 318.

The band split block 302a may comprise suitable logic, circuitry, and/or code that may be enabled to receive an input signal Rin from a speech decoder, for example, the plurality of speech decoding blocks 201a and 201b, and band split the input signal Rin into a lowband component and a highband component. The input signal Rin may be a wideband signal or a narrowband signal. If the input signal Rin is a wideband signal, the input signal Rin may be processed in a wideband mode of operation. In the wideband mode of operation, the lowband of the input signal Rin (lowband) and the highband of the input signal Rin (highband) may be processed independently. If the input signal Rin is a narrowband signal, the input signal Rin may be processed in a narrowband mode of operation. In the narrowband mode of operation, only the lowband of the input signal Rin (lowband) may be processed. In accordance with an embodiment of the invention, the band split block 302a may be enabled to split an input signal into, for example, a 50 Hz to 3.3 kHz lowband component sampled at 8 kHz and a 3.3 kHz to 7 kHz highband component sampled at 16 kHz.

The receive processing block 304 may comprise suitable logic, circuitry, and/or code that may be enabled to receive each of the lowband and highband components of the input signal. During egress of an input signal, the receive processing block 304 may be enabled to process each of the lowband and highband components of the input signal and generate lowband and highband components of an output signal Rout. In the wideband mode of operation, the lowband of the generated output signal Rout (lowband) and the highband of the generated output signal Rout (highband) may be processed independently and communicated to the subband analysis block 306 and the band combining block 310a. In the narrowband mode of operation, only the lowband of the generated output signal Rout (lowband) may be processed and communicated to the subband analysis block 306 and the band combining block 310a.

The band combining block 310a may comprise suitable logic, circuitry, and/or code that may be enabled to receive a lowband component and a highband component of the generated output signal Rout. In the wideband mode of operation, the band combining block 310a may be enabled to combine the lowband of the generated output signal Rout (lowband) and the highband of the generated output signal Rout (highband). In the narrowband mode of operation, the band combining block 310a may be enabled to process the lowband of generated output signal Rout (lowband). The band combining block 310a may be enabled to generate an output signal Rout to a speaker.

The subband analysis block 306 may comprise suitable logic, circuitry, and/or code that may be enabled to receive and process the lowband of the generated output signal Rout (lowband) and the highband of the generated output signal Rout (highband) in the wideband mode of operation. The subband analysis block 306 may be enabled to process the lowband of generated output signal Rout (lowband) in the narrowband mode of operation. The subband analysis block 306 may generate an output signal to the subband cancellation block 308. The subband analysis block 306 may be, for example, a windowed fast fourier transform (FFT) based subband filter or a multi-delay filter (MDF). The subband analysis block 306 may be enabled to decompose each of the lowband component of the input signal Rin (lowband) and the highband component of the input signal Rin (highband) into a plurality of frequency bands or subbands. The plurality of frequency bands or subbands may be overlapping in the frequency domain. In accordance with an embodiment of the invention, a subband decomposition with 32 bands may be performed on the lowband component and a 16 band decomposition may be performed on the highband component, for example. Since the highband component may have less energy in the first few bands, for example, first 6 bands, a plurality of the lowbands in the highband components may be discarded. The subband signals may be subsampled independently in the highband and lowband components. In accordance with an embodiment of the invention, the low 32 bands may be sampled at 400 Hz, for example, and the 10 high bands may be sampled at 800 Hz, for example.

The band split block 302b may comprise suitable logic, circuitry, and/or code that may be enabled to receive an input signal Sin from a MIC and band split the input signal Sin into a lowband component and a highband component. The input signal Sin may be a wideband signal or a narrowband signal. If the input signal Sin is a wideband signal, the input signal Sin may be processed in a wideband mode of operation. In the wideband mode of operation, the lowband of the input signal Sin (lowband) and the highband of the input signal Sin (highband) may be processed independently. If the input signal Sin is a narrowband signal, the input signal Sin may be processed in a narrowband mode of operation. In the narrowband mode of operation, only the lowband of the input signal Sin (lowband) may be processed. In accordance with an embodiment of the invention, the band split block 302b may be substantially similar to band split block 302a.

The subband analysis block 316 may comprise suitable logic, circuitry, and/or code that may be enabled to receive and process the lowband of the input signal Sin (lowband) and the highband of the input signal Sin (highband) in the wideband mode of operation. The subband analysis block 316 may be enabled to process the lowband of input signal Sin (lowband) in the narrowband mode of operation. The subband analysis block 316 may generate an output signal to the subband cancellation block 308 and the summer 318. In accordance with an embodiment of the invention, the subband analysis block 316 may be substantially similar to the subband analysis block 306.

The subband cancellation block 308 may comprise suitable logic, circuitry, and/or code that may be enabled to receive the subband processed generated output signals from the plurality of subband analysis blocks 306 and 316. The subband cancellation block 308 may be enabled to reduce and/or cancel the echo associated with the input signals Rin and Sin based on subband processing of each of the lowband and highband components of the input signals Rin and Sin. The subband acoustic echo canceller 300 may be enabled to dynamically switch between the wideband mode of operation and the narrowband mode of operation during, for example, a call transfer operation. The subband cancellation block 308 may be enabled to generate an output signal to the summer 318.

The summer 318 may be enabled to subtract the received generated output signals from the subband cancellation block 308 and the subband analysis block 316 and generate an output signal to the subband noise suppression block 312. The echo associated with the input signals Rin and Sin may be cancelled and/or reduced in the generated output signal from the summer 318.

The subband noise suppression block 312 may comprise suitable logic, circuitry, and/or code that may be enabled to suppress a noise associated with the input signals Rin and Sin, and may generate an output signal to the subband synthesis block 314. The subband noise suppression block 312 may be integrated within the subband acoustic echo canceller 300. The subband noise suppression block 312 may be enabled to track background noise within the subbands based on the input signals Rin and Sin. If the estimated echo associated with the input signals Rin and Sin is higher than the background noise associated with the input signals Rin and Sin, the subband noise suppression block 312 may be enabled to stop tracking the background noise upwards. The noise suppression, comfort noise generation (CNG) and/or the echo suppression functionalities may be integrated within the subband acoustic echo canceller 300. The subband noise suppression block 312 may be enabled to implement the noise suppression, CNG and/or the echo suppression functionalities.

The subband synthesis block 314 may comprise suitable logic, circuitry, and/or code that may be enabled to synthesize the received generated output signal from the subband noise suppression block 312. The subband synthesis block 314 may be enabled to generate the lowband and highband components of the processed signal. During ingress of an input signal Sin, the subband synthesis block 314 may be enabled to generate lowband and highband components of an output signal Sout. In the wideband mode of operation, the lowband of the generated output signal Sout (lowband) and the highband of the generated output signal Sout (highband) may be processed independently and communicated to the band combining block 310b. In the narrowband mode of operation, the lowband of the generated output signal Sout (lowband) may be processed and communicated to the band combining block 310b.

The band combining block 310b may comprise suitable logic, circuitry, and/or code that may be enabled to receive a lowband component and a highband component of the generated output signal Sout. In the wideband mode of operation, the band combining block 310b may be enabled to combine the lowband of the generated output signal Sout (lowband) and the highband of the generated output signal Sout (highband). In the narrowband mode of operation, the band combining block 310b may be enabled to process the lowband of generated output signal Sout (lowband). The band combining block 310b may be enabled to generate an output signal Sout to a speech encoder, for example, the plurality of speech encoding blocks 210a and 210b.

The split-band architecture 350 may be characterized by an ingress path and an egress path. The ingress path may transmit user input signals to a network, and the egress path may receive input signals from a network. The ingress path and the egress path may either operate in a wideband mode of operation, or a narrowband mode of operation.

Figure 3B:
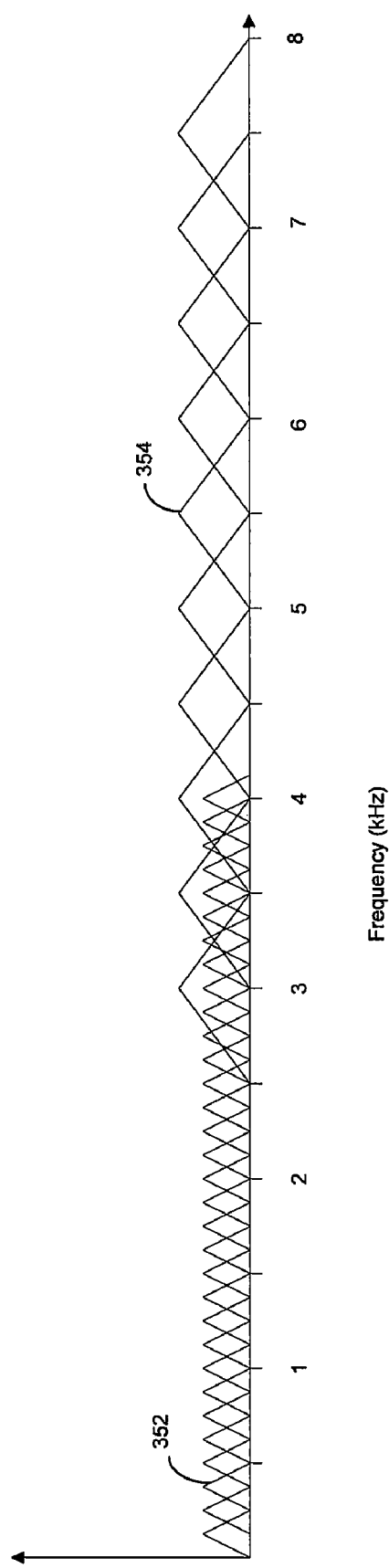
FIG. 3B is a diagram illustrating exemplary subband filters for the lowband and highband, in accordance with an embodiment of the invention.

FIG. 3B is a diagram illustrating exemplary subband filters for the lowband and highband, in accordance with an embodiment of the invention. Referring to FIG. 3B, there is shown a plurality of lowband components 352 and a plurality of highband components 354. The lowband components 352 may be separated by about 125 Hz, for example. The highband components 354 may be separated by about 500 Hz, for example.

Figure 4:
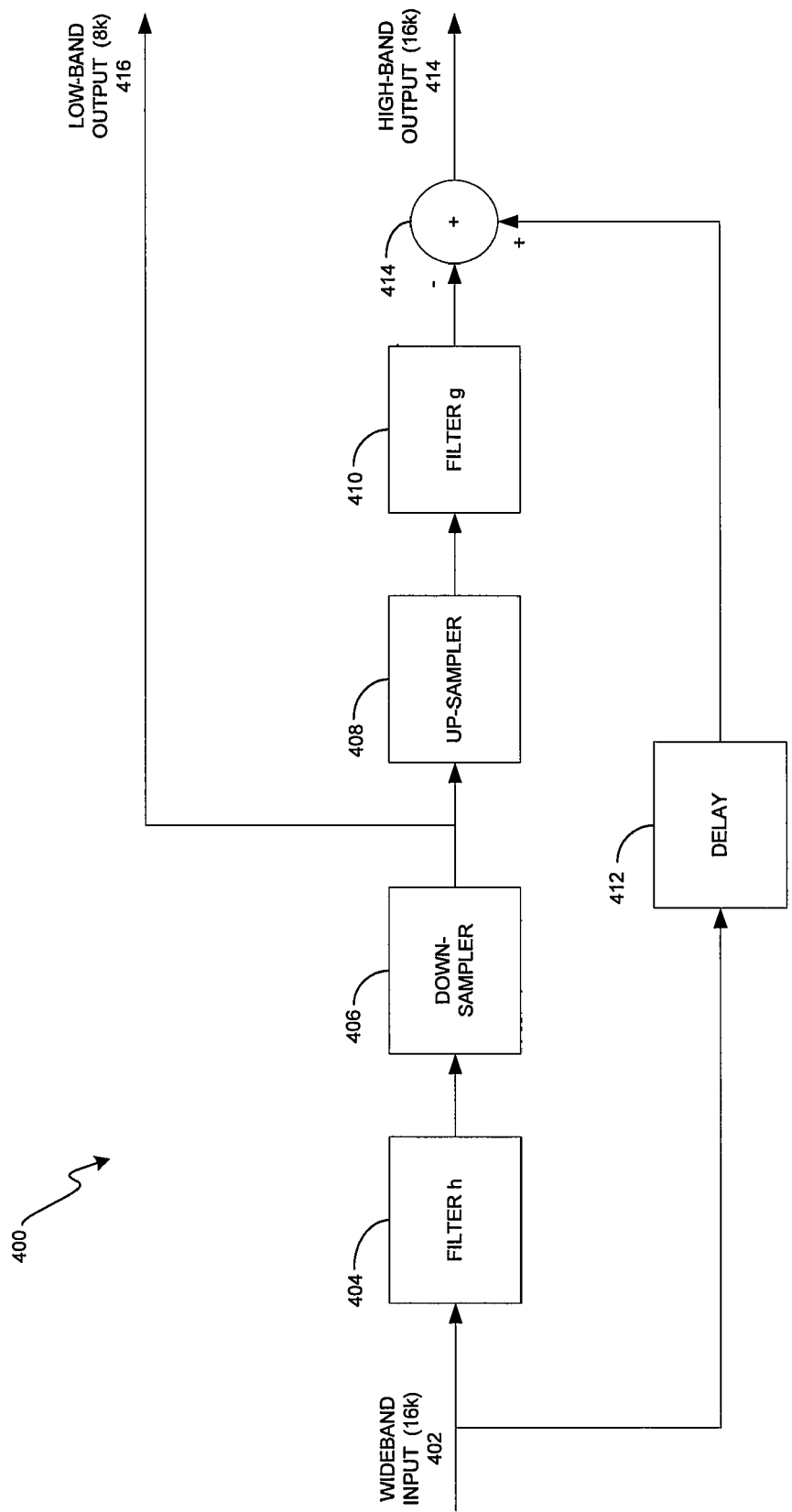
FIG. 4 is a block diagram of an exemplary band splitter, in accordance with an embodiment of the invention.

FIG. 4 is a block diagram of an exemplary band splitter, in accordance with an embodiment of the invention. Referring to FIG. 4, there is shown a band splitter 400. The band splitter 400 may comprise a finite impulse response (FIR) h 404, a down-sampler 406, an up-sampler 408, FIR filter g 410, a delay block 412, and a summer 414.

The FIR filter h 404 may comprise suitable logic, circuitry, and/or code that may be enabled to filter a received wideband input signal 402 and generate an output to the down-sampler 406. The down-sampler 406 may comprise suitable logic, circuitry, and/or code that may be enabled to down-sample the filtered wideband input signal 402. For example, the down-sampler 406 may be enabled to down-sample the filtered wideband input signal 402 by a factor of two to generate a low-band output signal 416. The low-band output signal 416 may be sampled at 8 kHz, for example.

The up-sampler 408 may comprise suitable logic, circuitry, and/or code that may be enabled to up-sample the down-sampled signal received from the down-sampler 406. For example, the up-sampler 408 may be enabled to up-sample the input signal by a factor of two. The FIR filter g 410 may be enabled to filter the up-sampled signal and generate an output signal to the summer 414. The delay block 412 may be enabled to delay the received wideband input signal 402 and generate an output signal to the summer 414. The summer 414 may be enabled to subtract the filtered up-sampled signal from the delayed wideband signal to remove the spectral content of the low-band signal from the delayed wideband signal and to generate a high-band output signal 414. The high-band output signal 414 may be sampled at 16 kHz, for example. Other methods of removing spectral content of the low-band signals from the wideband signals may also be used without departing from the spirit of the present invention.

Figure 5:
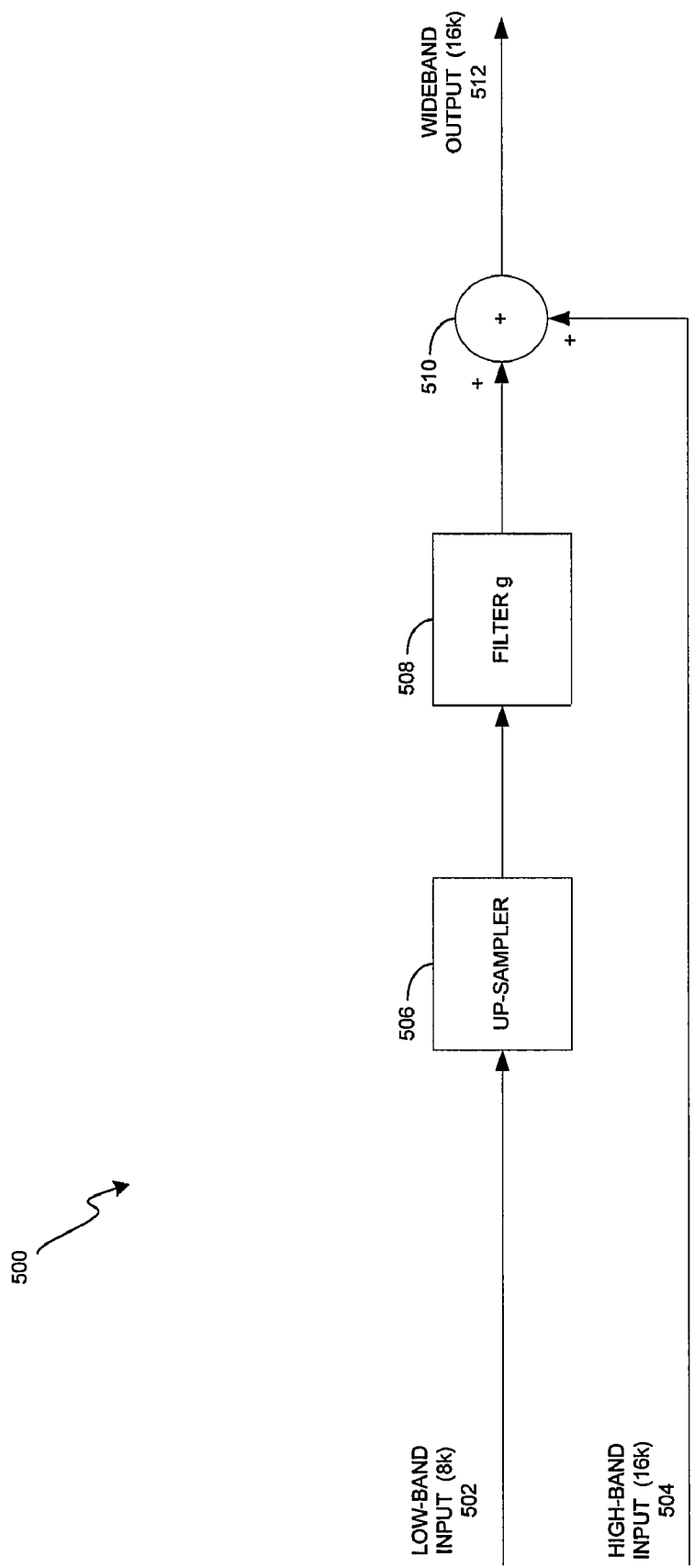
FIG. 5 is a block diagram of an exemplary band combiner, in accordance with an embodiment of the invention.

FIG. 5 is a block diagram of an exemplary band combiner, in accordance with an embodiment of the invention. Referring to FIG. 5, there is shown a band combiner 500. The band combiner 500 may comprise an up-sampler 506, a finite impulse response (FIR) g 508, and a summer 510.

The up-sampler 506 may comprise suitable logic, circuitry, and/or code that may be enabled to up-sample a received low-band input signal 502. The low-band input signal 502 may be sampled at 8 kHz, for example. The FIR filter g 508 may comprise suitable logic, circuitry, and/or code that may be enabled to filter the up-sampled low-band input signal 502 and generate an output to the summer 510.

The summer 510 may be enabled to receive a high-band input signal 504. The high-band input signal 504 may be sampled at 16 kHz, for example. The summer 510 may be enabled to sum the received high-band input signal 504 and the filtered output from the FIR filter g 508 and generate a wideband output signal 512. The wideband output signal 512 may be sampled at 16 kHz, for example.

Figure 6:
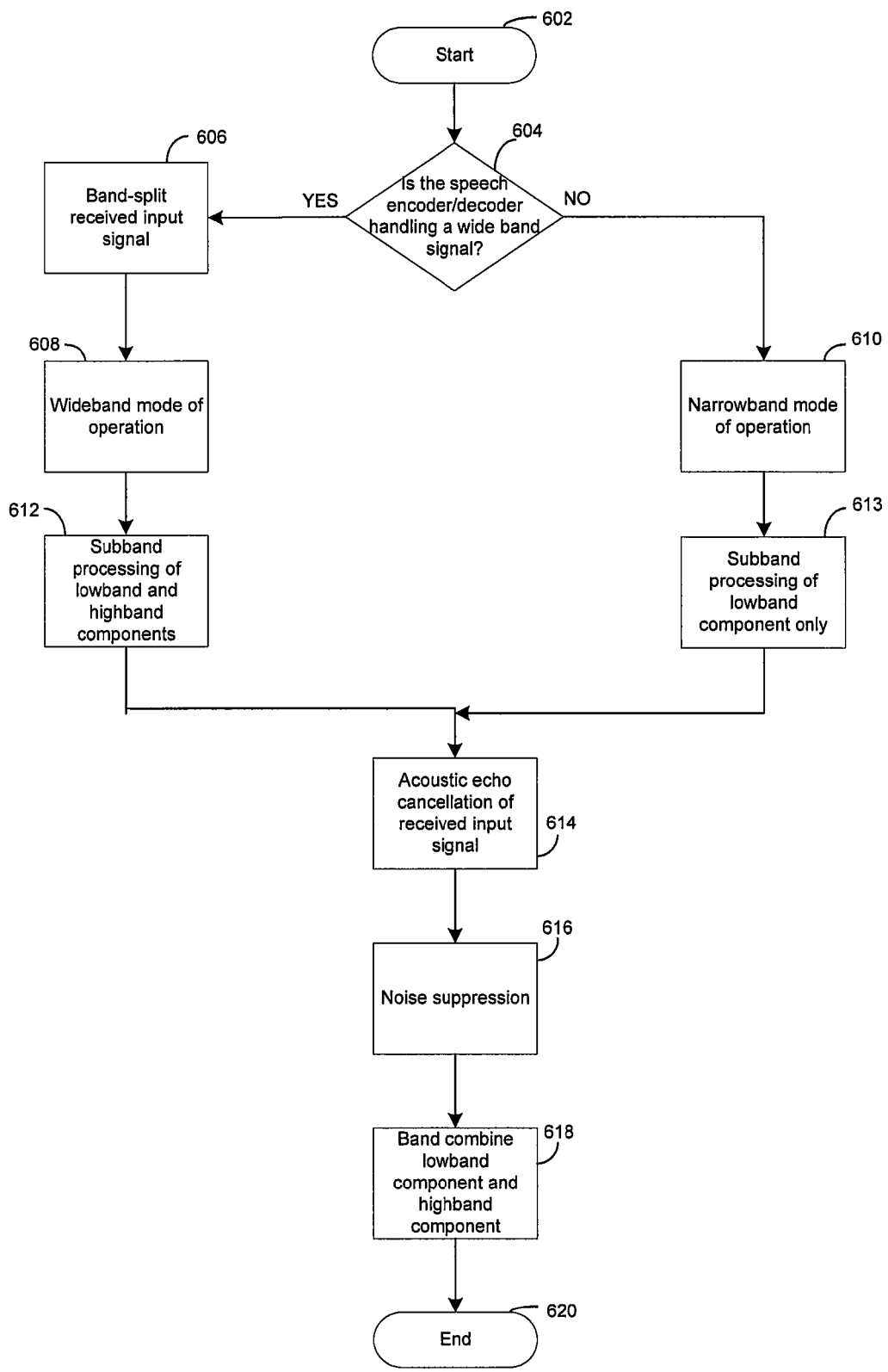
FIG. 6 is a flowchart illustrating exemplary steps for operating a dual mode subband acoustic echo canceller with integrated noise suppression, in accordance with an embodiment of the invention.

FIG. 6 is a flowchart illustrating exemplary steps for operating a dual mode subband acoustic echo canceller with integrated noise suppression, in accordance with an embodiment of the invention. Referring to FIG. 6, the exemplary steps may begin at step 602. In step 604, it may be determined whether the speech encoder, for example, 210a and 210b or the speech decoder, for example, 201a and 201b is handling a wideband signal. If the speech encoder or the speech decoder is not handling a wideband signal, control passes to step 606. In step 606, the band splitter 400 may be enabled to band split the input signal, for example, Rin or Sin into a lowband component and a highband component. In step 608, the input signal, Rin or Sin may be processed in a wideband mode of operation. In step 612, the lowband of the input signal Rin (lowband) and the highband of the input signal Rin (highband) may be processed independently. Control then passes to step 614. If the input signal is not a wideband signal, control passes to step 610. In step 610, the input signal Rin or Sin may be processed in a narrowband mode of operation. In step 613, only the lowband of the input signal Rin (lowband) may be processed. Control passes to step 614.

In step 614, an echo associated with the input signal, Rin or Sin may be cancelled based on subband processing of each of the lowband and highband components of the input signal, Rin or Sin. In step 616, a noise associated with the input signal, Rin or Sin may be suppressed within the subband acoustic echo canceller 300. In step 618, the band combiner 500 may be enabled to combine the lowband and highband components to generate an output signal. Control passes to end step 620.

In accordance with an embodiment of the invention, a method and system for a dual mode subband acoustic echo canceller with integrated noise suppression may include splitting an input signal, for example, Rin or Sin into a lowband component and a highband component. The subbands of each of the lowband component and the highband component may be processed in order to reduce an echo associated with the input signal and to suppress the noise associated with the input signal.

For example, the band split block 302a may be enabled to receive an input signal Rin from a speech decoder, for example, the plurality of speech decoding blocks 201a and 201b and band split the input signal Rin into a lowband component and a highband component. The input signal Rin may be a wideband signal or a narrowband signal. If the input signal Rin is a wideband signal, the input signal Rin may be processed in a wideband mode of operation. In the wideband mode of operation, the lowband of the input signal Rin (lowband) and the highband of the input signal Rin (highband) may be processed independently. If the input signal Rin is a narrowband signal, the input signal Rin may be processed in a narrowband mode of operation. In the narrowband mode of operation, only the lowband of the input signal Rin (lowband) may be processed.

The subband acoustic echo canceller 300 may be enabled to dynamically switch between the wideband mode of operation and the narrowband mode of operation during, for example, a call transfer operation. The band combiner 500 may be enabled to combine the lowband component and the highband component to generate an output signal. The plurality of decode processing blocks 201*a* and 201*b* may be enabled to decode each of the lowband and highband components of the input signal. The plurality of encode processing blocks 210*a* and 210*b* may be enabled to encode each of the lowband and highband components of the input signal.

Another embodiment of the invention may provide a machine-readable storage, having stored thereon, a computer program having at least one code section executable by a machine, thereby causing the machine to perform the steps as described above for a dual mode subband acoustic echo canceller with integrated noise suppression.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
   in a wideband mode of operation, subband processing of each of a lowband component and a highband component of a received input signal;
   in a narrowband mode of operation, processing said lowband component of said received input signal; and
   dynamically switching between said wideband mode of operation and said narrowband mode of operation.

2. The method according to claim 1, comprising reducing an echo associated with said received input signal.

3. The method according to claim 1, wherein said received input signal is a wideband signal.

4. The method according to claim 3, comprising splitting said received input signal into said lowband component and said highband component in said wideband mode of operation.

5. The method according to claim 3, comprising processing said lowband component and said highband component of said received input signal independently in said wideband mode of operation.

6. The method according to claim 1, comprising suppressing a noise associated with said received input signal.

7. The method according to claim 1, comprising dynamically switching between said wideband mode of operation and said narrowband mode of operation during a call transfer operation.

8. The method according to claim 1, comprising combining said lowband component and said highband component to generate an output signal.

9. The method according to claim 1, comprising decoding each of said lowband component and said highband component of said received input signal.

10. The method according to claim 1, comprising encoding each of said lowband component and said highband component of said received input signal.

11. A system for processing signals, the system comprising:
    one or more circuits that are operable to, in a wideband mode of operation, subband process each of a lowband component and a highband component of a received input signal;
    said one or more circuits are operable to, in a narrowband mode of operation, process said lowband component of said received input signal; and
    said one or more circuits are operable to dynamically switch between said wideband mode of operation and said narrowband mode of operation.

12. The system according to claim 11, wherein said one or more circuits are operable to reduce an echo associated with said received input signal.

13. The system according to claim 11, wherein said received input signal is a wideband signal.

14. The system according to claim 13, wherein said one or more circuits are operable to split said received input signal into said lowband component and said highband component in said wideband mode of operation.

15. The system according to claim 14, wherein said one or more circuits are operable to process said lowband component and said highband component of said received input signal independently in said wideband mode of operation.

16. The system according to claim 11, wherein said one or more circuits are operable to suppress a noise associated with said input signal.

17. The system according to claim 11, wherein said one or more circuits are operable to dynamically switch between said wideband mode of operation and said narrowband mode of operation during a call transfer operation.

18. The system according to claim 11, wherein said one or more circuits are operable to combine said lowband component and said highband component to generate an output signal.

19. The system according to claim 11, wherein said one or more circuits are operable to decode each of said lowband component and said highband component of said received input signal.

20. The system according to claim 11, wherein said one or more circuits are operable to encode each of said lowband component and said highband component of said received input signal.

* * * * *